(No Model.)

E. B. CLARKE.
CARPET SWEEPER.

No. 298,349. Patented May 13, 1884.

WITNESSES:
Charles E. Ward
Frank M. Carroll

INVENTOR
Erwin B. Clarke.
BY Leonard A. Ward
ATTORNEY

UNITED STATES PATENT OFFICE.

ERWIN B. CLARKE, OF GRAND RAPIDS, MICHIGAN.

CARPET-SWEEPER.

SPECIFICATION forming part of Letters Patent No. 298,349, dated May 13, 1884.

Application filed March 24, 1883. (No model.)

*To all whom it may concern:*

Be it known that I, ERWIN B. CLARKE, a citizen of the United States, residing at Grand Rapids, in the county of Kent and State of Michigan, have invented certain new and useful Improvements in Carpet-Sweepers, of which the following is a specification.

My invention relates to improvements in carpet-sweepers; and the invention consists in a novel combination of parts, all as will be hereinafter fully described, and set forth in the claim hereto annexed.

Figure 1:
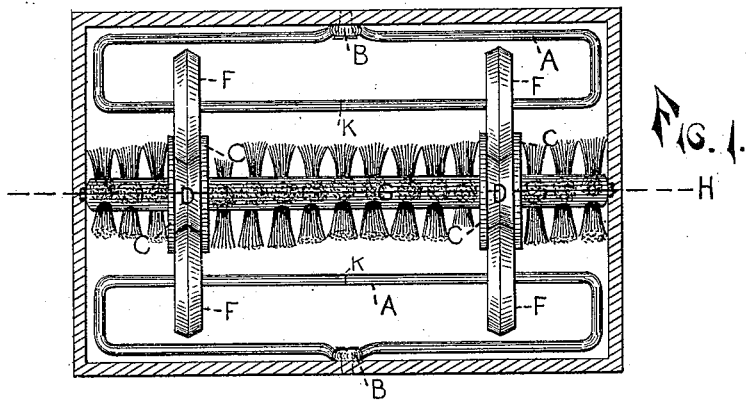
Figure 2:
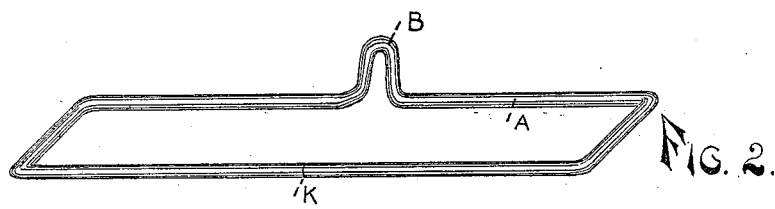
Figure 3:
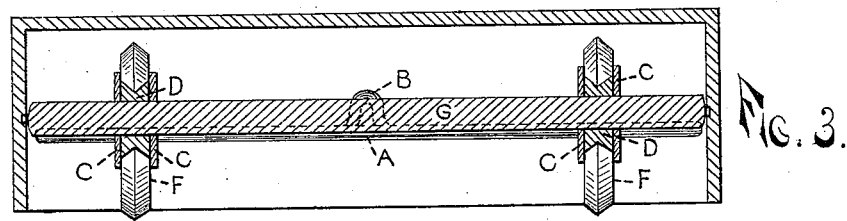
Figure 4:
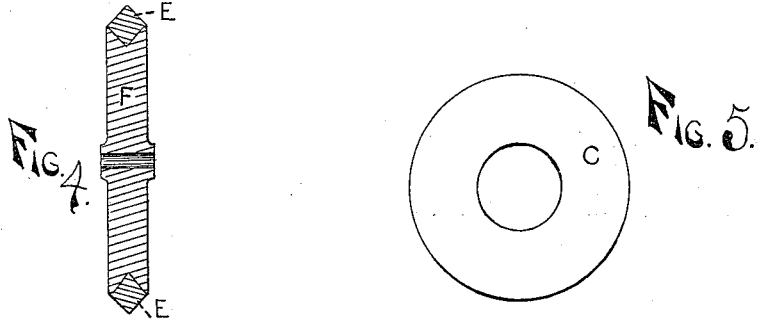
Figure 5:
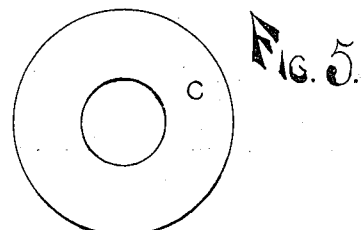

Referring to the accompanying drawings, Figure 1 is a bottom view of the interior of the sweeper, showing the improvements. Fig. 2 is a detached view of the rectangular-shaped wire. Fig. 3 is a view of a vertical section of Fig. 1. Fig. 4 is a vertical section of the drive-wheel. Fig. 5 is a detached side view of the flange.

Similar letters refer to similar parts throughout the several views.

A represents a rectangular wire, as shown in Figs. 1 and 2, which supports the drive-wheels, and at the same time maintains the requisite amount of friction between said wheels and those on the brush-roller to operate the sweeper on the roughest surfaces.

B represents a loop, as shown in Figs. 1 and 2, the object of which is to fasten the rectangular wire loosely to the sides of the sweeper-casing by means of a screw or bolt, thus giving to the drive-wheels and the brush-roller the requisite amount of friction above referred to.

C is a flange on the brush-roller, as shown in Figs. 1 and 5, for the purpose of protecting the bristles from the drive-wheels, and also to protect the drive-wheels from the bristles.

D is a pinion on the brush-roller G, as shown in Figs. 1 and 3.

E is a tire on the wheels F, as shown in Figs. 1 and 4.

F represents the drive-wheels, as shown on wires A in Fig. 1.

G is the brush-roller, as shown in Figs. 1 and 3.

H represents pivots at the ends of the brush-roller, as shown in Fig. 1. These pivots are fitted into slots in the ends of the sweeper-casing, thus forming the bearings proper of the brush-roller.

K represents the junction of the ends of the wire A, which permits the placing of the drive-wheels F on the wire as shown in Fig. 2. The wheels F may be placed on the wires A at any point or points between the ends of the brush-roller. The flanges may be made of paper, metal, or other suitable material. The wire A is designed to be spring metal.

Tire E, as shown in Fig. 4, is cut square, and fitted into a V-shaped groove in the wheel F, leaving the tire V-shaped above the circumference of the wheel, which enters a corresponding V-shaped groove in pinion D, the object being to provide a firm and substantial manner of holding the tire on the wheel, and at the same time always carrying the wheels directly to the center of pinion D, thus preventing any interference of the wheels with the flanges. The tire may be made of rubber, leather, or other suitable material.

I am aware that round or beveled tires have been used, but not for the purpose here described, and they form no part of my present invention.

Having thus described my invention, what I claim to have invented, and desire to secure by Letters Patent, is—

In a carpet-sweeper, the combination of the brush-roller provided with the pinions D D, and the rectangular spring-wires *a a*, loosely connected to the opposite sides of the sweeper-casing, and each wire provided with the wheels F F, the several parts being arranged relatively to each other, substantially in the manner as and for the purpose herein shown and described.

In testimony whereof I have hereunto set my hand in the presence of two witnesses.

ERWIN B. CLARKE.

Witnesses:
LEONARD A. WARD,
CHARLES E. WARD.